(12) United States Patent
Lee et al.

(10) Patent No.: US 7,206,519 B2
(45) Date of Patent: Apr. 17, 2007

(54) DUOBINARY OPTICAL TRANSMISSION APPARATUS

(75) Inventors: Han-Lim Lee, Seoul (KR); Gyu-Woong Lee, Suwon-shi (KR); Seong-Taek Hwang, Pyongtaek-shi (KR); Byung-Chang Kang, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 635 days.

(21) Appl. No.: 10/453,005

(22) Filed: Jun. 3, 2003

(65) Prior Publication Data

US 2004/0101314 A1     May 27, 2004

(30) Foreign Application Priority Data

Nov. 22, 2002   (KR)   ................ 10-2002-0073161

(51) Int. Cl.
*H04B 10/04* (2006.01)
*H04B 10/12* (2006.01)

(52) U.S. Cl. ..................... 398/186; 398/188
(58) Field of Classification Search ............. 398/183, 398/201, 154, 186, 188
See application file for complete search history.

(56) References Cited

U.S. PATENT DOCUMENTS

| | | | |
|---|---|---|---|
| 6,362,913 B2 * | 3/2002 | Ooi et al. | 359/245 |
| 6,580,840 B1 * | 6/2003 | McBrien et al. | 385/2 |
| 6,865,348 B2 * | 3/2005 | Miyamoto et al. | 398/183 |
| 2002/0030878 A1 | 3/2002 | Ohhiro | 359/183 |

FOREIGN PATENT DOCUMENTS

| | | |
|---|---|---|
| EP | 1128580 | 2/2001 |
| JP | 2001-308792 | 11/2001 |
| JP | 2002-077059 | 3/2002 |
| JP | 2002-164850 | 6/2002 |
| WO | WO 02/05464 | 1/2002 |

OTHER PUBLICATIONS

S. Walklin et al., "On the Relationship Between Chromatic Dispersion and Transmitter Filter Response in Duobinary Optical Communication Systems", IEEE Photonics Technology Letter, vol. 9, No. 7, Jul. 1997.*

H. Kim et al., "Demonstration of Optical Duobinary Transmission System Using Phase Modulator and Optical Filter", IEEE Photonics Technology Letters, vol. 14, No. 7, Jul. 2002.*

* cited by examiner

*Primary Examiner*—Shi K. Li
(74) *Attorney, Agent, or Firm*—Cha & Reiter, L.L.C.

(57) ABSTRACT

Disclosed is a duobinary optical transmission apparatus. The duobinary optical transmission apparatusenhances nonlinear and dispersion characteristics for an intermediate-long distance transmission at a high-speed transfer rate without the use an electric LPF. The duobinary optical transmission apparatus includes a light source for generating a carrier wave, a duobinary optical signal generator for receiving a Non Return to Zero (NRZ) signal and generating a modulated optical signal generated by modulating the carrier wave according to the NRZ signal, and a Return to Zero (RZ) signal generator for converting the NRZ signal into a RZ (Return to Zero) signal. Therefore, optical intensity and a phase are modulated using only a single interferometer-type optical modulator.

4 Claims, 6 Drawing Sheets

DUOBINARY OPTICAL TRANSMISSION APPARATUS

CLAIM OF PRIORITY

This application claims priority to an application entitled "DUOBINARY OPTICAL TRANSMISSION APPARATUS," filed in the Korean Intellectual Property Office on Nov. 22, 2002 and assigned Serial No. 2002-73161, the contents of which are hereby incorporated by reference.

BACKGROUND OF THE INVENTION

1. Field of the Invention

The present invention relates to a duobinary optical transmission apparatus using a duobinary optical transmission technique.

2. Description of the Related Art

In general, a Dense Wavelength Division Multiplexing (DWDM) optical transmission system transmits an optical signal using a single optical fiber in such a way that it enhances transmission efficiency. The optical signal is comprised of a plurality of channels having different wavelengths. In addition, the DWDM optical transmission system has been widely used for a super high-speed Internet network, which has rapidly increasing data transfer quantity, because it transmits optical signals irrespective of a transfer rate. Recently, systems for transmitting more than 100 channels using a single optical fiber using such a DWDM optical transmission method have been commercially produced. Moreover, a new system for simultaneously transmitting more than 200 channels each, which have a transfer rate of 40 Gb/s, to accomplish a transfer rate of more than 10 Tbps is under development.

Such a newly developed system accommodates rapidly increasing data traffic as well as transfer requests for high-speed data of more than 40 Gbps. However, a conventional optical intensity modulation method using an Non-Return to Zero (NRZ) method has a limitations, for example, in increasing the transfer quantity because an abrupt interference and distortion between channels occurs in a prescribed zone less than a channel interval of 50 GHz. Further, DC frequency components of a conventional binary NRZ transmission signal and high-frequency components spreading in a modulation procedure cause nonlinear characteristics and dispersion, while the DC and high-frequency components are propagated in an optical fiber medium. This, in turn, limits the transmission distance at a high-speed transfer rate over 10 Gbps.

In recent times, optical duobinary techniques have been intensively researched to find a new optical transmission technique for obviating the transmission distance limitation caused by chromatic dispersion. The optical duobinary technique has advantages in reducing the width of the transmission spectrum much more than a general binary transmission method. The transmission distance in a dispersion limitation system is inversely proportional to a square of a transmission spectrum bandwidth. That is, where the transmission spectrum bandwidth is reduced by half, the transmission distance increases by four times. Also, the carrier wave frequency is suppressed in a duobinary transmission spectrum such that limitations in output optical power caused by the Brillouin Scattering stimulated in an optical fiber are reduced.

Also, there has been a newly proposed duobinary RZ transmission method having nonlinear and dispersion characteristics superior to those of the aforementioned binary NRZ transmission method (for an intermediate-long distance transmission at a high-speed transfer rate over 10 Gbps).

FIG. 1 is a block diagram of a conventional optical transmission apparatus using a duobinary Return to Zero (RZ) transmission method.

Referring to FIG. 1, a conventional duobinary optical transmission apparatus includes a duobinary signal generator 10 and a RZ pulse generator 20 to generate a duobinary RZ signal.

The duobinary signal generator 10 includes (1) a differential precoder 11 for encoding an input two-level NRZ electric signal, (2) a drive amplifier 12 for amplifying the two-level NRZ electric signal generated from the differential precoder 11, and generating an optical modulator driving signal, (3) a LPF (Low Pass Filter) 13 for converting the amplified two-level electric signal into a three-level electric signal, and reducing a bandwidth of the three-level electric signal, (4) a laser source 14 for generating a carrier wave, and (5) a Mach-Zehnder-interferometer-type optical intensity modulator (MZ MOD) 15.

The duobinary signal generator 10 is classified according to an electrode structure of the MZ MOD 15 (generally into two kinds of generators). An X-cut type MZ MOD having a single electrode is shown in FIG. 1, and it connects its own one arm to drive amplifier 12 and LPF 13 to transmit a three-level signal to one electrode. Alternatively (not shown), a Z-cut type MZ MOD having a dual electrode connects both arms each to the drive amplifier and the LPF in such a way that a three-level electric signal is applied to each of the electrodes of the Z-cut type MZ MOD.

The RZ pulse generator 20 includes MZ MOD 21 and clock generator 22 for generating a clock signal with a period of a bit rate T.

The operation of the aforementioned conventional duobinary optical transmission apparatus is described in detail below.

The two-level N RZ data is encoded as a two-level binary signal at a differential precoder 11, and is then amplified by drive amplifier 12. The amplified two-level binary signal is applied to a LPF 13. The LPF 13 has a prescribed bandwidth corresponding to ¼ of a clock frequency of the two-level binary signal. Interference between codes is generated by excessive restriction of the bandwidth, and therefore the two-level binary signal is converted into a three-level duobinary signal because of the interference between codes. The three-level duobinary signal functions as a driving signal of the MZ MOD 15. The carrier wave generated from the laser source 14 modulates its own phase and optical intensity using the MZ MOD 15, and is thereby generated as an optical duobinary signal. The optical duobinary signal generated from the duobinary signal generator 10 is applied to a MZ MOD 21 contained in the RZ pulse generator 20 to establish a signal conversion from a NRZ signal to a RZ signal. Typically, it is well known in the art that a clock generator 22's clock signal with a period of a bit rate T is applied to an optical modulator 21 such as a MZ MOD to convert a NRZ signal applied to the MZ MOD into a RZ signal. In this way, the optical duobinary signal applied to the MZ MOD 21 is converted into the RZ signal by a MZ MOD 21 synchronized with the clock generator 22's clock signal with a period of a bit rate T.

As shown in FIGS. 2a and 2b, a duobinary RZ signal has been proposed having frequency efficiency per bit and nonlinear characteristics which are superior than those of previous NRZ and RZ signals. FIG. 2a depicts the appearance of an output signal of FIG. 1, and FIG. 2b depicts the appearance of optical spectrum characteristics of the output signal of FIG. 1.

However, such a conventional duobinary transmission technique generates a three-level electric signal using a LPF such that a difference in characteristics is generated depending on transmission quality. And, the transmission quality corresponds to the transmission characteristics of the LPF and the length of Pseudo Random Bit Sequence (PRBS). This, in turn, causes a serious problem in the overall system. Typically, a slope along which a signal's level changes from a 0-level to a 1-level is different from a slope along which a signal's level changes from the 1-level to the 0-level. However, in case of a duobinary optical transmission apparatus using a LPF, parts having different slopes are mutually summed up at one time. Consequently, increased jitters of the output waves are caused when a first signal transition from 0-level to 1-level and a second signal transition from 1-level to 0-level is performed. This jitter problem is generated in the Z-cut type or X-cut type conventional structure. The dependency of such signal patterns provides a limitation in a real optical transmission operation.

SUMMARY OF THE INVENTION

The present invention reduces or overcomes many of the above limitations by providing a duobinary optical transmission apparatus for maintaining constant transmission characteristics without being affected by the length of the PRBS.

The present invention also provides a duobinary optical transmission apparatus that (1) does not use an electric LPF, (2) enhances nonlinear and dispersion characteristics in case of an intermediate-long distance transmission at a high-speed transfer rate. Thus, the duobinary optical transmission apparatus reduces the production cost as well as simultaneously ensuring the signal transmission quality.

In accordance with one illustrative embodiment of the present invention, a duobinary optical transmission apparatus is provided, comprising a light source for generating a carrier wave, a duobinary optical signal generator for receiving a NRZ signal, and generating a modulated optical signal generated by modulating the carrier wave according to the NRZ signal, and a RZ signal generator for converting the NRZ signal into a RZ signal.

The duobinary optical signal generator includes a differential precoder for encoding the NRZ signal, a modulator drive amplifier for amplifying the encoded NRZ signal and generating a modulator drive signal, a first Mach-Zehnder-interferometer-type optical intensity modulator (MZ MOD) for modulating a phase of the carrier wave according to a drive signal received from the modulator drive amplifier, and an optical BPF (Band Pass Filter) for limiting a bandwidth of the phase-modulated signal received from the first Mach-Zehnder-interferometer-type optical intensity modulator (MZ MOD).

The RZ signal generator includes a clock generator for generating a clock signal with a period of a transfer bit rate, and a second Mach-Zehnder-interferometer-type optical intensity modulator (MZ MOD) synchronized with the clock signal, for converting the NRZ signal into a RZ signal.

Preferably, the first Mach-Zehnder-interferometer-type optical intensity modulator (MZ MOD) may perform a modulation operation at a minimum point (i.e., a null point) of its own transmission curve.

Preferably, the second Mach-Zehnder-interferometer-type optical intensity modulator (MZ MOD) may apply a clock signal to a quad point between the maximum point and the minimum point of its own transmission curve, and then perform a modulation operation.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Figure 1:
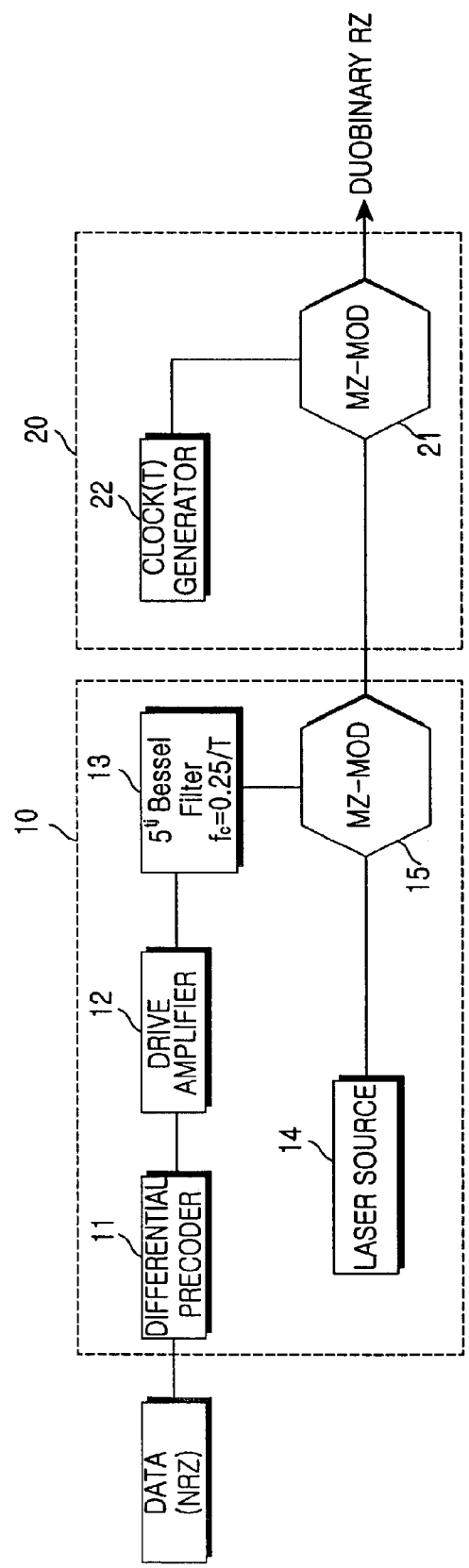
FIG. 1 is a block diagram of a conventional duobinary optical transmission apparatus.

In the following description of the present invention, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will comprise many known f functions and configurations all of which need not be shown here. In the drawings, the same or similar elements are denoted by the same reference numerals even though they are depicted in different drawings.

Figure 3:
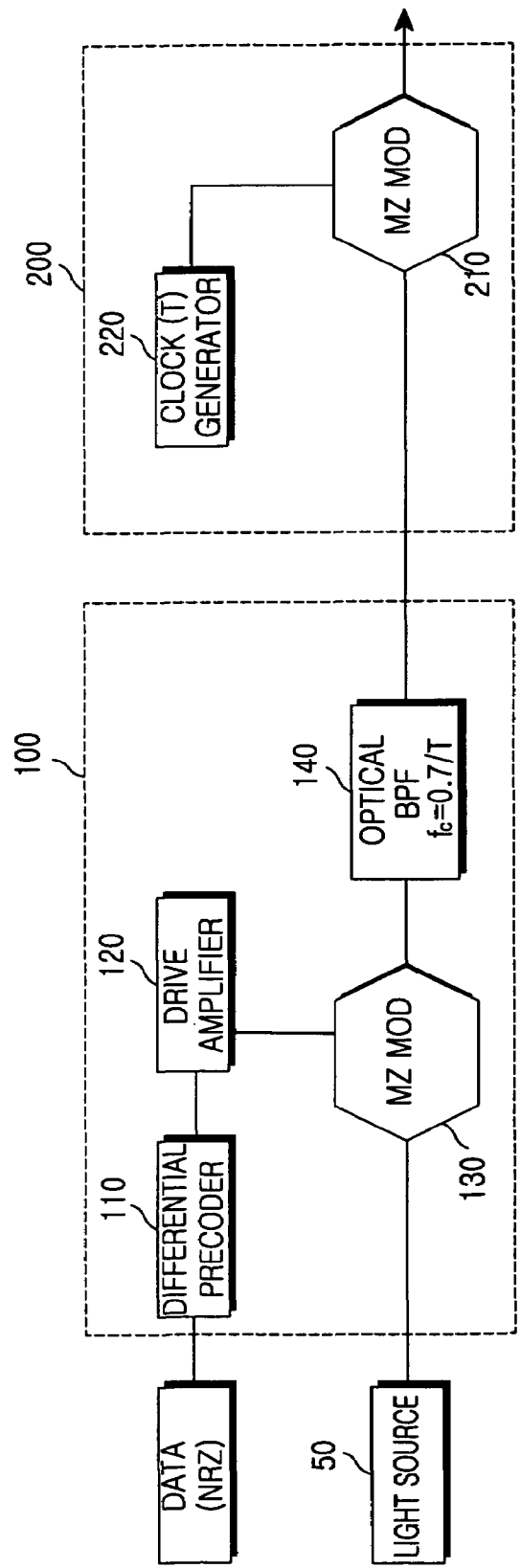
FIG. 3 is a block diagram of a duobinary optical transmission apparatus in accordance with a preferred embodiment of the present invention.

FIG. 3 is a block diagram of a duobinary optical transmission apparatus in accordance with a preferred embodiment of the present invention.

Referring to FIG. 3, a duobinary optical transmission apparatus according to the present invention includes a light source 50 for generating a carrier wave, a duobinary optical signal generator 100 for receiving a NRZ electric signal, and modulating the NRZ electric signal into a duobinary optical signal, and a RZ pulse generator 200 for generating a RZ pulse. Although the duobinary optical transmission apparatus, in FIG. 3, shows a specific structure where the duobinary signal generator 100 is positioned prior to the RZ pulse generator 200, their positions may be interchangeable with each other.

The light source 50 generates a carrier wave wherein information is loaded, and may adopt a laser diode.

The duobinary optical signal generator 100 converts an input NRZ electric signal into a duobinary optical signal. Duobinary optical signal generator 100 is comprised of a differential precoder 110, a drive amplifier 120, a Mach-Zehnder-interferometer-type optical intensity modulator (MZ MOD) 130, and an optical band pass filter (BPF) 140.

The differential precoder 110 encodes the input NRZ electric signal and enables a duobinary transmission/reception operation without changing the receiver.

The drive amplifier 120 amplifies the encoded binary signal, and the amplified binary signal is adapted as a driving signal of the MZ MOD 130.

The MZ MOD 130 phase-modulates the carrier wave according to the two-level binary signal received via a modulation terminal RF (not shown), and generates the phase-modulated carrier wave.

The optical BPF 140 has a bandwidth corresponding to 0.7/T of a bit rate, and removes signals from the bandwidth in such away that it restricts the bandwidth of the phase-modulated duobinary optical signal.

The RZ pulse generator 200 converts a NRZ-modulated signal into a RZ signal. RZ pulse generator 200 is comprised of a MZ MOD 210 and a clock generator 220.

FIGS. 4a–4d are views illustrating a conversion procedure of a duobinary RZ output signal in accordance with a preferred embodiment of the present invention. Operations of the duobinary optical transmission apparatus will hereinafter be described with reference to FIGS. 4a–4d.

Referring to FIGS. 3 and 4a–4d, a NRZ electric signal is applied to differential precoder 110 of the duobinary optical signal generator 100 in such a way that it is encoded as a binary signal of 0 or 1. The encoded binary signal is applied to a drive amplifier 120, and functions as a driving signal A of the MZ MOD 130. A modulation operation is performed at a null point N of a modulation curve of the MZ MOD 130, and the magnitude of such modulation is $2V\pi$. For reference, $V\pi$ is the magnitude of modulation needed to perform an ON/OFF operation. In this case, a bit of 0 or 1 is generated as an optical signal D having the same magnitude as the bit, without modulating its own intensity. The bit of 0 or 1 is converted into phase information having a phase difference of 0 or $\pi$ in an electric field C. Therefore, as one skilled in the art will recognize such a phase modulation operation can be phase-modulated by a general-interferometer-type optical intensity modulator. The phase-modulated optical signal by the MZ MOD 130 passes an optical BPF 140 having 0.7/T of a transfer bit rate.

Figure 4A:
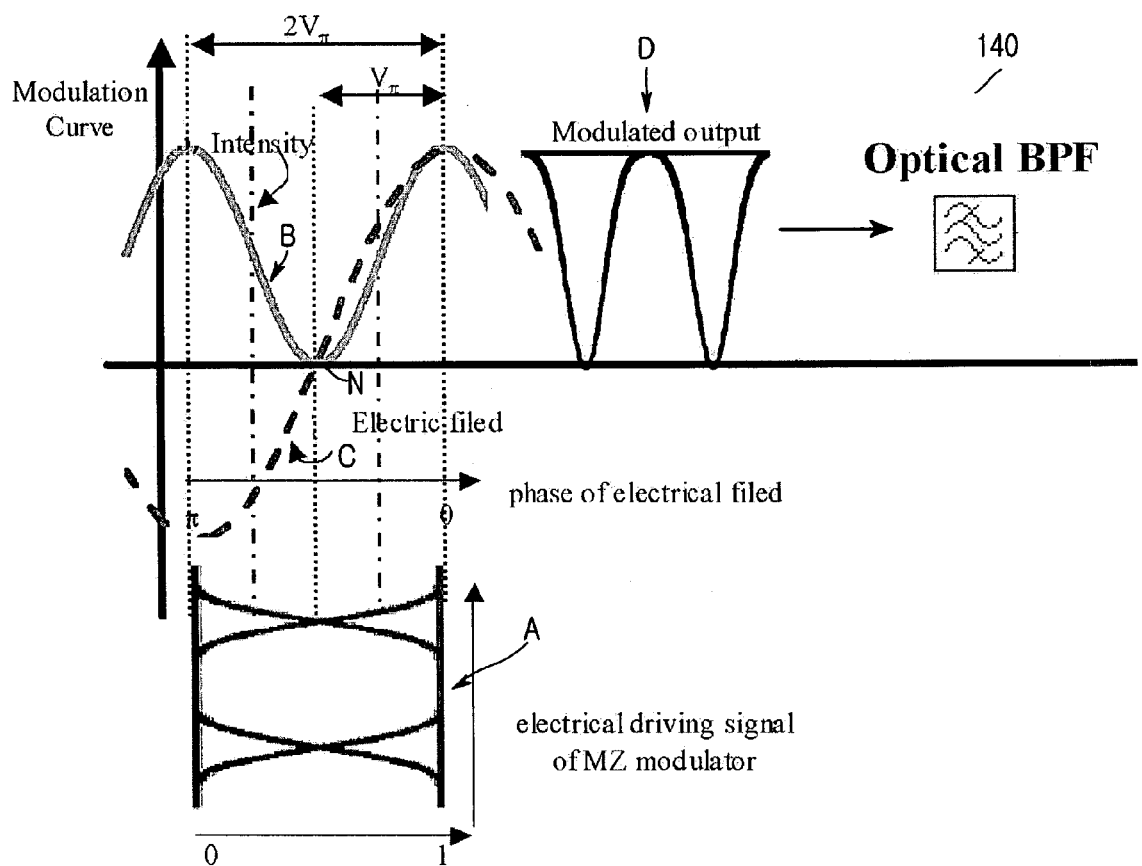
FIGS. 4a–4d are views illustrating a conversion procedure of a duobinary RZ output signal in accordance with a preferred embodiment of the present invention.
Figure 4B:
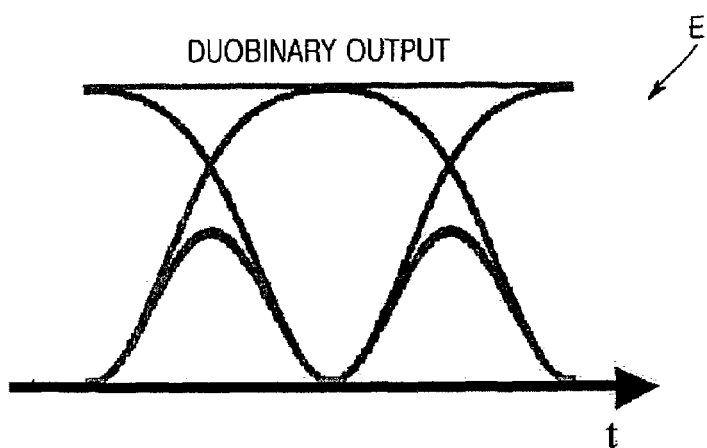

Importantly, the operation of the optical BPF 140 is similar to those of an electric LPF of the conventional duobinary optical transmission apparatus. Accordingly, the optical signal passing through the optical BPF is converted into a duobinary optical signal as shown in FIG. 4b. A voltage of $2V\pi$ is applied to the duobinary optical transmission apparatus in accordance with a preferred embodiment of the present invention, and a duobinary optical signal is generated by an optical BPF 140 with a bandwidth corresponding to 0.7/bit rate(T). However, the duobinary optical transmission apparatus can adjust duobinary optical signal characteristics by adjusting the applied voltage and the bandwidth of the optical BPF 140.

Figure 4C:
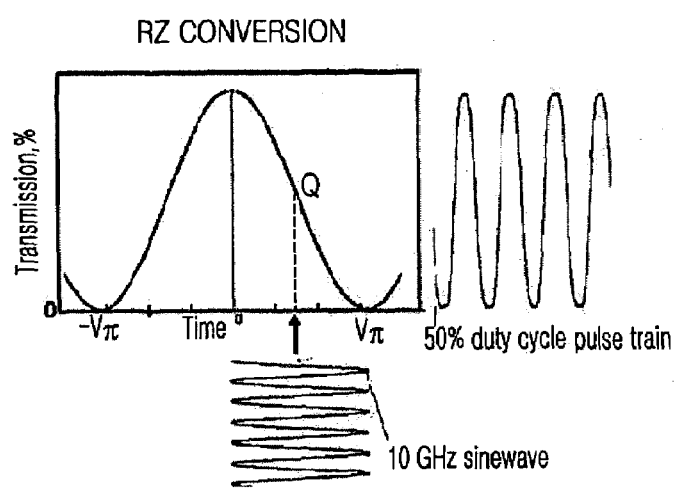
Figure 4D:
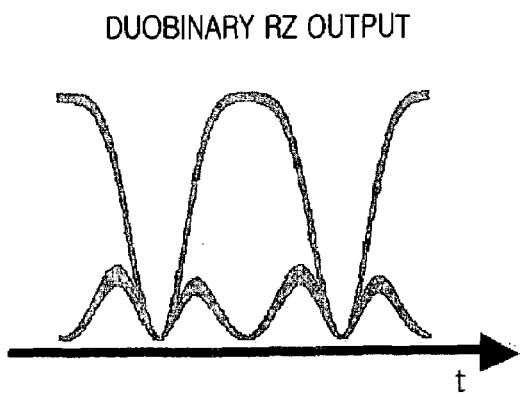

The duobinary optical signal E is applied to a MZ MOD 210 of the RZ pulse generator 200 in such a way that it is converted into a RZ signal. Generally, a clock generator 220's clock signal with a period of a bit rate is applied to the MZ MOD 210 to convert a NRZ signal into a RZ signal. FIG. 4c shows a clock signal having an amplitude $V\pi$ and a period of a bit rate T is applied at a quad point Q being a middle point between a maximum point and a minimum point of the transmission curve. FIG. 4d shows the duobinary RZ signal that is generated.

Figure 2A:
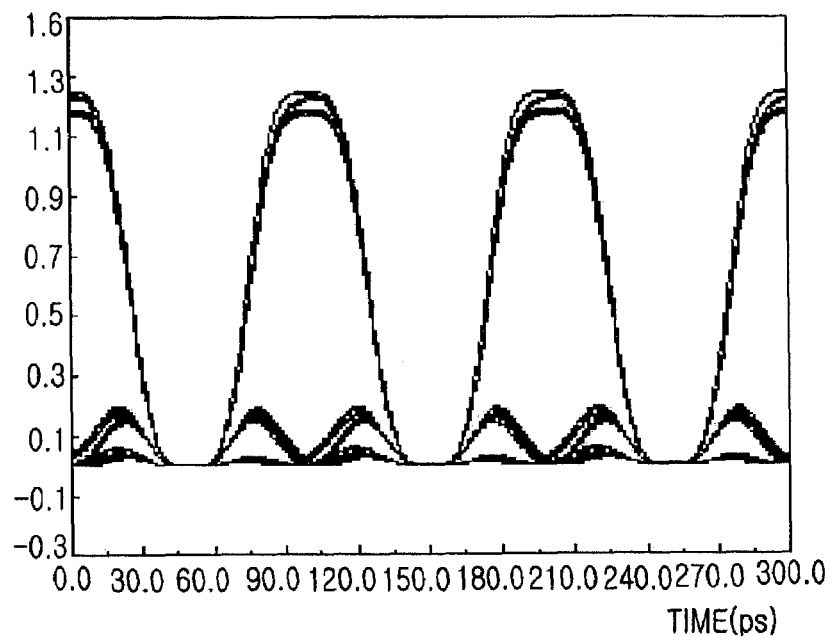
FIG. 2a illustrates an output signal of FIG. 1.
Figure 2B:
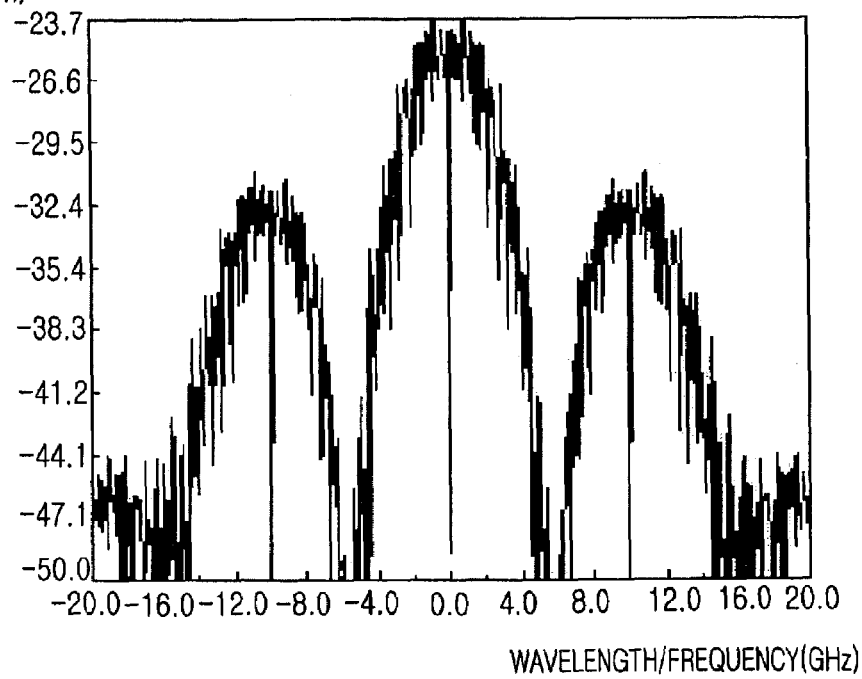
FIG. 2b illustrates the optical spectrum characteristics of the output signal of FIG. 1.
Figure 5A:
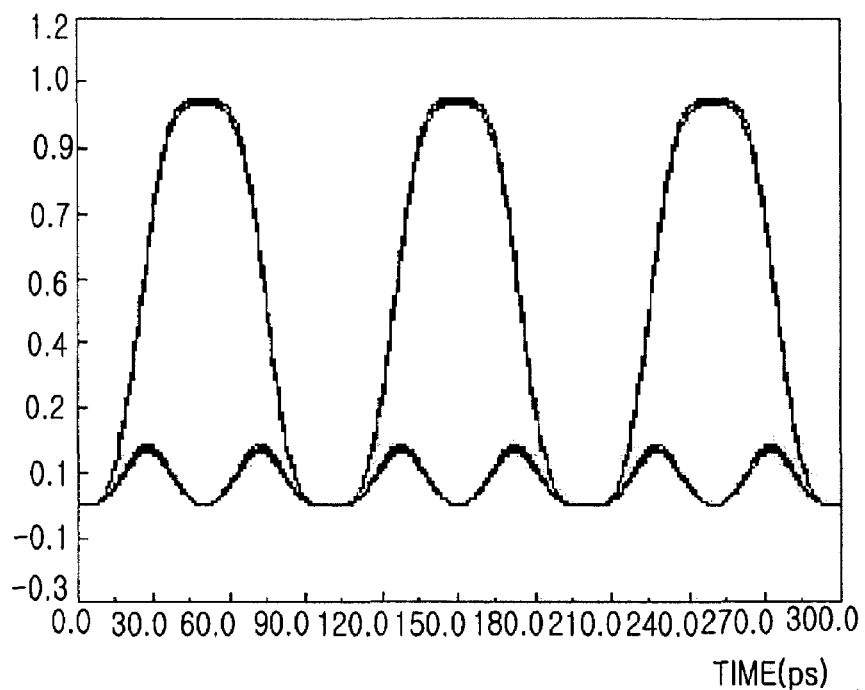
FIG. 5a illustrates an output signal of FIG. 3.
Figure 5B:
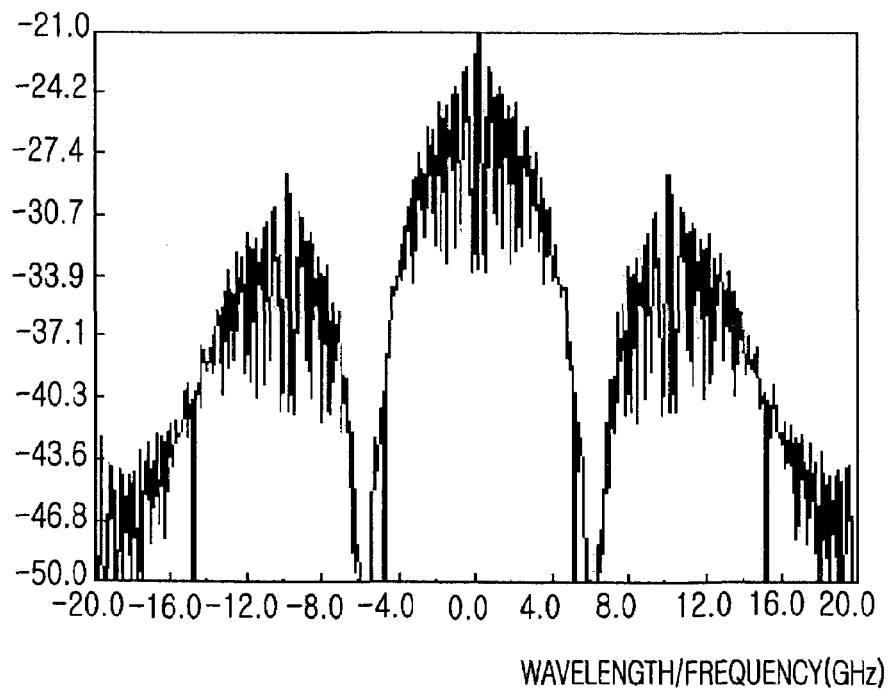
FIG. 5b illustrates the optical spectrum characteristics of the output signal of FIG. 3.

FIG. 5a illustrates an output signal of FIG. 3, and FIG. 5b illustrates the optical spectrum characteristics of the output signal of FIG. 3. As can be seen from FIGS. 5a–5b, a duobinary RZ optical signal having similar characteristics with output signals shown in FIGS. 2a–2b is generated.

Using the above procedures, the duobinary optical transmission apparatus according to the present invention generates a duobinary RZ optical signal without using an electric LPF, and minimizes signal distortion caused by signal conversion from a two-level signal to a three-level signal. Also, the duobinary RZ optical signal determines tolerance for optical fiber's dispersion on the basis of the extinction ratio and chirp parameter of the RZ signal generated by a MZ MOD 210 contained in the RZ optical signal generator 200. Therefore, an optimum extinction ratio and an optimum chirp parameter are determined in consideration of characteristics of an optical modulator, such as a MZ MOD.

Although the present invention describes an X-cut type MZ MOD with a single electrode, as one skilled in the art will recognize it can be implemented with a Z-cut type MZ MOD with a dual electrode. Also, although the present invention describes an optical intensity modulator or an optical phase modulator to easily recognize each modulator's function in blocks shown in the drawings, it is noted that optical intensity and phase are modulated using only a single interferometer-type optical modulator.

As is apparent from the above description, the duobinary optical transmission apparatus according to the present invention generates a duobinary RZ optical signal using a low-cost general interferometer-type optical modulator instead of an electric LPF. As a result, the duobinary optical transmission apparatus obviates the dependency of both transmission quality and of a bit pattern, which are caused by transmission characteristics of the electric LPF. In addition, it greatly enhances nonlinear and dispersion characteristics in case of an intermediate-long distance transmission at a high-speed transfer rate over 10 Gbps.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A duobinary optical transmission apparatus, comprising:
    a light source for generating a carrier wave;
    a duobinary optical signal generator for receiving a NRZ signal and generating a modulated optical NRZ signal, wherein the duobinary optical signal generator includes a differential precoder for encoding the NRZ signal; a modulator drive amplifier for amplifying the encoded NRZ signal and generating a modulator drive signal; a first Mach-Zehnder-interferometer-type optical intensity modulator (MZ MOD) for modulating a phase of the carrier wave according to a drive signal received from the modulator drive amplifier; and an optical Band Pass Filter (BPF) for limiting a bandwidth of the phase-modulated signal received from the first Mach-Zehnder-interferometer-type optical intensity modulator (MZ MOD); and
    a RZ signal generator including a clock generator and a second Mach-Zehnder-interferometer-type optical intensity modulator (MZ MOD) synchronized with the clock signal from the clock generator, for converting the NRZ signal into a RZ signal, wherein the second Mach-Zehnder-interferometer-type optical intensity modulator (MZ MOD) applies a clock signal to a quad point between a maximum point and a minimum point of its own transmission curve, and then performs a modulation operation.

2. The duobinary optical transmission apparatus as set forth in claim 1, wherein the duobinary optical signal characteristics are adjustable by adjusting a bandwidth of the optical BPF.

3. The duobinary optical transmission apparatus as set forth in claim 1, wherein the optical BPF has a bandwidth corresponding to substantially a 0.7 bit rate.

4. The duobinary optical transmission apparatus as set forth in claim 1, wherein the first and second optical intensity modulators are Z-cut type MZ MODs.

* * * * *